United States Patent
Diab et al.

(10) Patent No.: US 8,396,853 B2
(45) Date of Patent: Mar. 12, 2013

(54) INVERSE SEARCH SYSTEMS AND METHODS

(75) Inventors: Ali Diab, Atherton, CA (US); David Ku, Palo Alto, CA (US); Kevin Lee, East Palo Alto, CA (US); Qi Lu, Saratoga, CA (US); Nam Nguyen, Fremont, CA (US); Eckart Walther, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/419,867

(22) Filed: Mar. 14, 2012

(65) Prior Publication Data

US 2012/0173505 A1    Jul. 5, 2012

Related U.S. Application Data

(63) Continuation of application No. 11/081,822, filed on Mar. 15, 2005, now Pat. No. 8,150,825.

(60) Provisional application No. 60/553,645, filed on Mar. 15, 2004.

(51) Int. Cl.
*G06F 7/00* (2006.01)
*G06F 17/30* (2006.01)

(52) U.S. Cl. ........................................ 707/706; 707/723

(58) Field of Classification Search ........................ None
See application file for complete search history.

(56) References Cited

U.S. PATENT DOCUMENTS

| | | | |
|---|---|---|---|
| 6,484,162 B1 | 11/2002 | Edlund et al. | |
| 6,564,208 B1 | 5/2003 | Littlefield et al. | |
| 7,209,916 B1 | 4/2007 | Seshadri et al. | |
| 7,558,917 B2 * | 7/2009 | Madan et al. | 711/118 |
| 7,801,896 B2 | 9/2010 | Szabo | |
| 8,150,825 B2 * | 4/2012 | Diab et al. | 707/706 |
| 2002/0083031 A1 | 6/2002 | DeVarax | |
| 2003/0050916 A1 | 3/2003 | Ortega et al. | |
| 2003/0051240 A1 | 3/2003 | Schaffer et al. | |
| 2004/0064447 A1 | 4/2004 | Simske et al. | |
| 2004/0167889 A1 | 8/2004 | Chang et al. | |
| 2005/0010605 A1 | 1/2005 | Conrad et al. | |
| 2005/0187906 A1 * | 8/2005 | Madan et al. | 707/3 |
| 2005/0203888 A1 | 9/2005 | Woosley et al. | |
| 2005/0223042 A1 | 10/2005 | Evans et al. | |
| 2005/0262062 A1 | 11/2005 | Xia | |
| 2005/0283468 A1 | 12/2005 | Kamvar et al. | |
| 2007/0078874 A1 * | 4/2007 | Stern et al. | 707/101 |

OTHER PUBLICATIONS

Notification Concerning Transmittal of International Preliminary Report on Patentability (Chapter I of the Patent Cooperation Treaty) for corresponding International application No. PCT/US2005/008641.

* cited by examiner

*Primary Examiner* — Rehana Perveen
*Assistant Examiner* — Raheem Hoffler
(74) *Attorney, Agent, or Firm* — Hickman Palermo Truong Becker Bingham Wong LLP

(57) ABSTRACT

Inverse search systems and methods operate on identifiers of content items in a corpus such as the World Wide Web In an inverse search, the user submits a query that includes an identifier of a target content item in the corpus and receives information (metadata) about the target content item being returned to the user. Many types of metadata can be returned, including ratings or other metadata related to the target content item obtained from users, popularity data specific to the target content item, information about previously submitted forward search queries that led to the target content item being identified as a hit, and metadata extracted from the target content item.

20 Claims, 5 Drawing Sheets

SEARCH! [restaurant reviews san jose] (Search)

Search Results  302

Results 1 - 10 of about 463,000 for restaurant reviews san jose - 0.16 sec. (About this page)

M~~~~~~~
weekly newspaper covering Silicon Valley movies, music, arts, and events.
Category: California > San Jose > Newspapers
www.domain1.com/cheapfood.html - *16k* - Cached - More from this site
( Inverse Search )  304
 306

I~~~~: San Jose Restaurants, San Jose Restaurant Reviews
Read first-hand travel reviews and see pictures of restaurants and dining options in San Jose. ...
Search San Jose restaurant reviews by Type. ... Search San Jose restaurant reviews by Price Range. ...
domain2.com/planning/- *63k* - Cached - More from this site
( Inverse Search )

San Jose restaurants: Read San Jose restaurant reviews
San Jose Restaurants: Visit ~~~~~, your source for reviews of restaurants in San Jose, plus unbiased information on hotels and vacations, worldwide ... San Jose restaurants. Reviews of hotels and vacations ... 71 Saint Peter, San Jose. Restaurant popularity: #2 in San Jose. Cuisines: French, Italian, Mediterranean, Spanish ...
www.domain3.com/Restaurants-SanJose.html - *69k* - Cached - More from this site
( Inverse Search )

United_States/CA/San_Jose
Find direct links to restaurant reviews all over the web, or write your own review of a restaurant.
domain3.org/United_States/CA/San_Jose - *22k* - Cached - More from this site
( Inverse Search )

California > San Jose > Restaurant Reviews in the Yahoo! Directory
Yahoo! reviewed these sites and found them related to California > San Jose > Restaurant Reviews
... San Jose > Restaurant Reviews. Directory > Regional > U.S. States > California > Cities > San Jose > Entertainment and Arts > Restaurants > Reviews ... Search. the Web San Jose. Advanced ...
dir.yahoo.com/Regional/U_S__States/California/.../Restaurants/Reviews - *7k* - Cached - More from thi
( Inverse Search )

Restaurants in San Jose, California - D~~~~~
D~~~~~, San Jose restaurant guide features restaurants; menus; ratings and reviews; gift certificates; auctions; on-line reservations; and, streaming videos. ... home > california > san jose. San Jose, California. that are . . . Affordable Moderate-Priced Expensive ... Redwood City SALINAS San Carlos San Lorenzo San Martin Santa Clara SANTA ...
www.domain4.com/SanJoseCalifornia - *31k* - Cached - More from this site
( Inverse Search )

FIG. 3

INVERSE SEARCH SYSTEMS AND METHODS

CROSS-REFERENCE TO RELATED APPLICATIONS; BENEFIT CLAIM

This application claims benefit under 35 U.S.C. §120 as a Continuation of application Ser. No. 11/081,822, filed Mar. 15, 2005, which claims benefit under 35 U.S.C. §119(e) of U.S. Provisional Application No. 60/553,645, filed Mar. 15, 2004, entitled "Inverse Search Systems and Methods," to which this application also claims benefit. The entire contents of each of these applications is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

The present disclosure is related to the following commonly-assigned co-pending U.S. patent applications:

Application Ser. No. 11/081,860, filed Mar. 15, 2005, entitled "Search Systems and Methods with Integration of User Annotations"; and Application Ser. No. 11/082,202, filed Mar. 15, 2005, entitled "Search Systems and Methods with Integration of User Annotations from a Trust Network."

The respective disclosures of these applications are incorporated herein by reference in their entirety for all purposes.

BACKGROUND OF THE INVENTION

The present invention relates in general to searching a corpus of documents, and in particular to search systems and methods with integration of trusted user judgments.

The World Wide Web (Web) provides a large collection of interlinked information sources (in various formats including documents, images, and media content) relating to virtually every subject imaginable. As the Web has grown, the ability of users to search this collection and identify content relevant to a particular subject has become increasingly important, and a number of search service providers now exist to meet this need. In general, a search service provider publishes a web page at which a user can enter a query indicating what the user is interested in. In response to the query, the provider generates and transmits to the user a list of links to Web pages or sites considered relevant to that query, typically in the form of a "search results" page.

Query response generally involves the following steps. First, a pre-created index or database of Web pages or sites is searched using one or more keywords from the query to generate a list of hits (usually references to pages or sites that contain the keywords or are otherwise identified as being relevant to the query). Next, the hits are ranked according to predefined criteria, and the best results (according to these criteria) can be given the most prominent placement, e.g., at the top of the list. The ranked list of hits is transmitted to the user, usually in the form of a "results" page (or set of interconnected pages) containing a list of links to the hit pages or sites. Other features, such as sponsored links or advertisements, may also be included.

Ranking of hits is an important factor in whether a user's search ends in success or frustration. Frequently, a query will return such a large number of hits that it is impossible for a user to explore all of the hits in a reasonable time. If the first few links a user clicks through fail to lead to relevant content, the user will often give up on the search and possibly on the search service provider, even though relevant content was available farther down the list.

To maximize the likelihood that relevant content will be prominently placed, search service providers have developed increasingly sophisticated page ranking criteria and algorithms. In the early days of Web search, rankings were usually based on number of occurrences and/or proximity of search terms on a given page. This proved inadequate, and algorithms in use today typically consider various other information, such as the number of other sites on the Web that link to a given target page (which reflects how useful other content providers think the target page is), in addition to the presence of search terms. One algorithm allows users who enter a particular query to provide feedback by rating the hits that are returned. Such ratings are stored in association with the query, and previous positive ratings are used as a factor in ranking hits the next time that query is entered.

Even with the most sophisticated ranking algorithms, searches may still fail to return relevant content or to rank such content highly enough that the user can readily find it. In such instances, the user generally receives little guidance toward improving the results, which only adds to the user's frustration. For example, users often know what sort of information they are trying to find and may even find one or two relevant hits in a search, but they cannot readily determine how to modify the query to increase the number of relevant results.

Thus, it would be desirable to provide search services with feedback features to enhance the likelihood of returning relevant content to each user.

BRIEF SUMMARY OF THE INVENTION

Embodiments of the present invention provide systems and methods for performing an "inverse search" on a corpus of content items, such as the World Wide Web. In a conventional search (referred to herein as a "forward" search), the user submits a query, usually containing search terms and/or other indicators of the type of content of interest, and receives in response a list of identifiers (e.g., URLs) of related content items in the corpus or actual items of content from the corpus. In an inverse search, in contrast, the user submits an identifier (e.g., a URL) of a "target" content item receives in response various kinds of information (metadata) about the target content item. Many types of metadata can be returned, including but not limited to ratings or other metadata related to the target content item obtained from users, popularity data specific to the target content item, information about previously submitted forward search queries that led to the target content item being identified as a hit, and metadata extracted from the target content item.

According to one aspect of the present invention, a method for performing an inverse search includes receiving an inverse search query from a querying user, where the inverse search query including a target content identifier. Metadata associated with the target content identifier is obtained from a data store containing metadata associated with particular content identifiers, where at least some of the metadata was collected during previous interactions of users with the computer system. An inverse search report is generated, based at least in part on the obtained metadata, and the inverse search report is transmitted to the querying user. The content identifier might be, e.g., a URL identifying a World Wide Web page or site, and the querying user can be a human or a computer (or a human using a computer). In some embodiments, the querying user communicates with the computer system via a network.

Many types of metadata may be supported. In some embodiments, the inverse search report includes a popularity score for the target content identifier. The popularity score can be computed in advance and retrieved as metadata from the data store during the act of obtaining the metadata, or the act of obtaining the metadata can include retrieving raw popularity data from the data store and computing the popularity score from the raw popularity data. A popularity score may be defined in various ways. For instance, where the computer system includes a forward search module, the popularity score can be based on a clickthrough rate for the target content identifier measured from previous forward searches executed by the computer system. In one embodiment, the clickthrough rate is defined as $N_{click}/N_{hit}$, where $N_{hit}$, is a number of previous instances of forward searches executed by the computer system for which the target content identifier was returned as a hit and $N_{click}$ is the number of such instances that resulted in user navigation to the content identified by the target content identifier.

In other embodiments where the computer system includes a forward search module, the act of obtaining the metadata includes retrieving from the data store some number of referral queries for the target content identifier, where each referral query is a forward search query previously submitted to the computer system for which the computer system returned the target content identifier as a hit. The referral queries are included in the inverse search report. The referral queries can be included in the inverse search report in a list order based at least in part on a clickthrough rate for the target content identifier relative to each of the referral queries.

In still other embodiments, the act of obtaining the metadata includes retrieving from the data store user-specific metadata associated with the target content identifier, where the user-specific metadata was previously received from the querying user. The user-specific metadata is included in the inverse search report. The user-specific metadata might include, e.g., a user-supplied rating of a target content item identified by the target content identifier.

In other embodiments, the act of obtaining the metadata includes retrieving from the data store user-specific metadata associated with the target content identifier, where the user-specific metadata was previously received from a user other than the querying user. The other user might be, for instance, a member of a trust network defined for the querying user, and the user-specific metadata might include, e.g., a user-supplied rating of a target content item identified by the target content identifier. This user-specific metadata can also be included in the inverse search report.

In further embodiments, the act of obtaining the metadata includes retrieving from the data store annotations associated with the target content identifier, where each annotation was previously received from one of a number of users and where each annotation includes user-specific metadata. The user-specific metadata is aggregated across the plurality of retrieved annotations, and the aggregated metadata is included in the inverse search report. The users might include, e.g., users who are members of a trust network defined for the querying user, or all users of the computer system. The user-specific metadata of the annotations might include, e.g., a user-supplied rating of a target content item identified by the target content identifier, and the aggregated metadata might include, e.g., an average rating of the target content item determined from the user-supplied ratings.

In some embodiments, the act of obtaining the metadata includes retrieving from the data store a global rating associated with the content identifier, where the global rating is computed from individual ratings of a target content item identified by the content identifier, each individual rating being submitted by a user of the search system. The global rating can also be included in the inverse search report.

In still other embodiments, the inverse search report also includes metadata extracted from a target content item identified by the target content identifier. The metadata can be extracted from the target content item in response to the inverse search query, or the metadata can be extracted from the target content item and stored in the data store prior to receiving the inverse search query, and the act of obtaining the metadata can include retrieving the extracted metadata from the data store. Examples of metadata that can be extracted from the target content item include: a physical location of an owner or provider of the target content item; an indicator as to whether the target content item includes adult content; an indicator as to whether the target content item includes a pop-up window; and so on.

According to another aspect of the present invention, a computer system for performing an inverse search includes a data store, a metadata collection module communicably coupled to the data store, and an inverse search server communicably coupled to the data store. The data store is configured to store metadata associated with particular content items. The metadata collection module is configured such that, during a user interaction with the computer system, the metadata collection module adds to the data store metadata associated with particular content items. The inverse search server includes input control logic, search control logic, and reporting control logic. The input control logic is configured to receive an inverse search query from a querying user, where the inverse search query includes a target content identifier. The search control logic is configured to obtain metadata associated with the target content identifier from the data store. The reporting control logic is configured to generate an inverse search report based at least in part on the metadata retrieved by the search control logic and to transmit the inverse search report to the querying user.

The following detailed description together with the accompanying drawings will provide a better understanding of the nature and advantages of the present invention.

BRIEF DESCRIPTION OF THE DRAWINGS

FIG. 3 is an example of a forward search results page generated in response to a user query according to an embodiment of the present invention.

DETAILED DESCRIPTION OF THE INVENTION

Embodiments of the present invention provide systems and methods for performing an "inverse search" on a corpus of content items, such as the World Wide Web. In a conventional search (referred to herein as a "forward" search), the user submits a query, usually containing search terms and/or other indicators of the type of content of interest, and receives in response a list of identifiers (e.g., URLs) of related content items in the corpus or actual items of content from the corpus. In an inverse search, in contrast, the user submits an identifier (e.g., a URL) of a "target" content item receives in response various kinds of information (metadata) about the target content item. Many types of metadata can be returned, including but not limited to ratings or other metadata related to the target content item obtained from users, popularity data specific to the target content item, information about previously submitted forward search queries that led to the target content item being identified as a hit, and metadata extracted from the target content item.

1. Overview

A. Network Implementation

Figure 1:
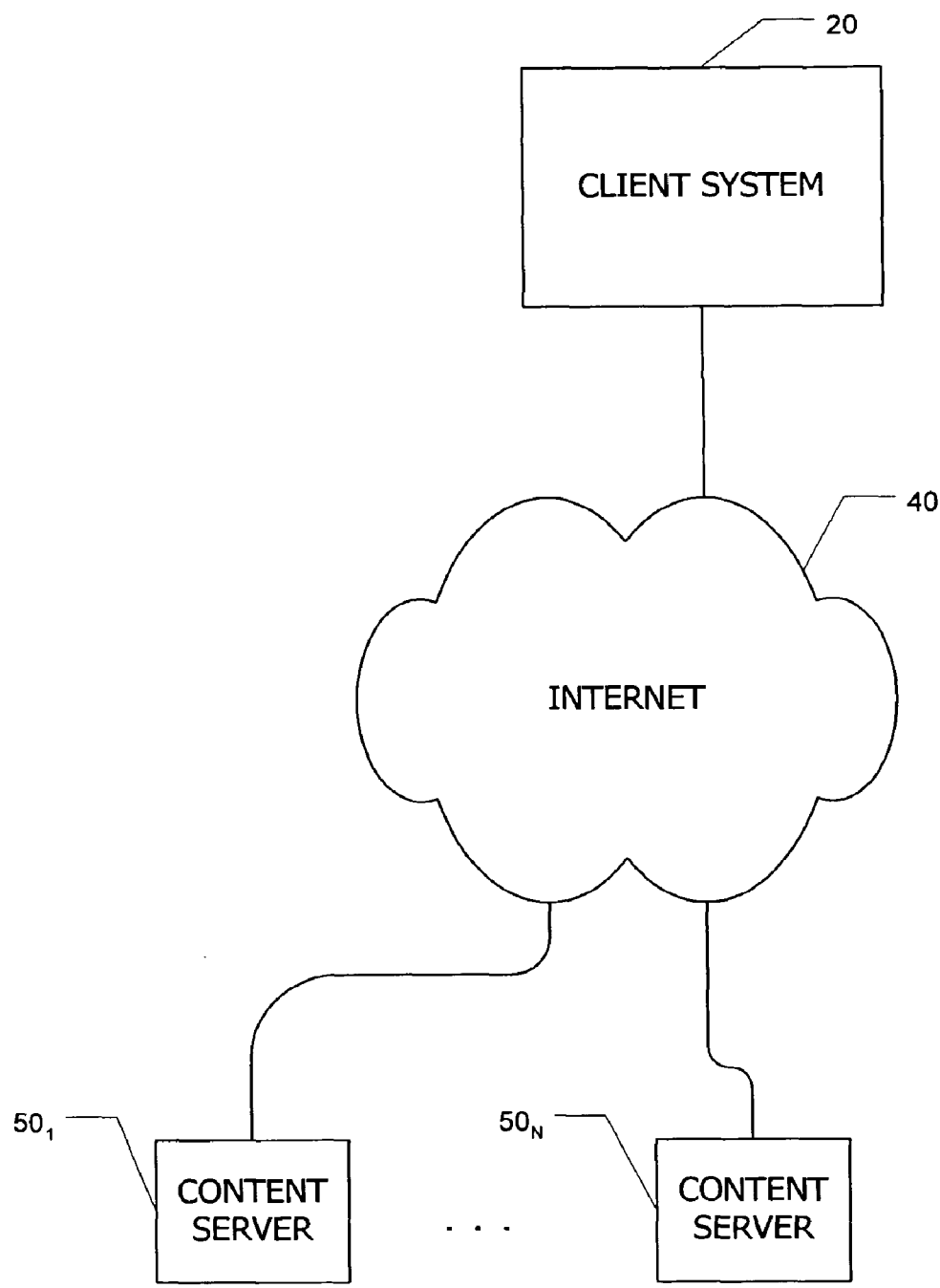
FIG. 1 is a block diagram of an information retrieval and communication network according to an embodiment of the present invention.

FIG. 1 illustrates a general overview of an information retrieval and communication network 10 including a client system 20 according to an embodiment of the present invention. In computer network 10, client system 20 is coupled through the Internet 40, or other communication network, e.g., over any local area network (LAN) or wide area network (WAN) connection, to any number of server systems 50.sub.1 to 50.sub.N. As will be described herein, client system 20 is configured according to the present invention to communicate with any of server systems 50.sub.1 to 50.sub.N, e.g., to access, receive, retrieve and display media content and other information such as web pages.

Several elements in the system shown in FIG. 1 include conventional, well-known elements that need not be explained in detail here. For example, client system 20 could include a desktop personal computer, workstation, laptop, personal digital assistant (PDA), cell phone, or any WAP-enabled device or any other computing device capable of interfacing directly or indirectly to the Internet. Client system 20 typically runs a browsing program, such as Microsoft's Internet Explorer™ browser, Netscape Navigator™ browser, Mozilla™ browser, Opera™ browser, or a WAP-enabled browser in the case of a cell phone, PDA or other wireless device, or the like, allowing a user of client system 20 to access, process and view information and pages available to it from server systems 50.sub.1 to 50.sub.N over Internet 40. Client system 20 also typically includes one or more user interface devices 22, such as a keyboard, a mouse, touch screen, pen or the like, for interacting with a graphical user interface (GUI) provided by the browser on a display (e.g., monitor screen, LCD display, etc.), in conjunction with pages, forms and other information provided by server systems 50.sub.1 to 50.sub.N or other servers. The present invention is suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are operator configurable using an application including computer code run using a central processing unit such as an Intel Pentium™ processor, AMD Athlon™ processor, or the like or multiple processors. Computer code for operating and configuring client system 20 to communicate, process and display data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems 50.sub.1 to 50.sub.N to client system 20 over the Internet, or transmitted over any other network connection (e.g., extranet, VPN, LAN, or other conventional networks) using any communication medium and protocols (e.g., TCP/IP, HTTP, HTTPS, Ethernet, or other conventional media and protocols).

It should be appreciated that computer code for implementing aspects of the present invention can be C, C++, HTML, XML, Java, JavaScript, etc. code, or any other suitable scripting language (e.g., VBScript), or any other suitable programming language that can be executed on client system 20 or compiled to execute on client system 20. In some embodiments, no code is downloaded to client system 20, and needed code is executed by a server, or code already present at client system 20 is executed.

B. Search System

Figure 2:
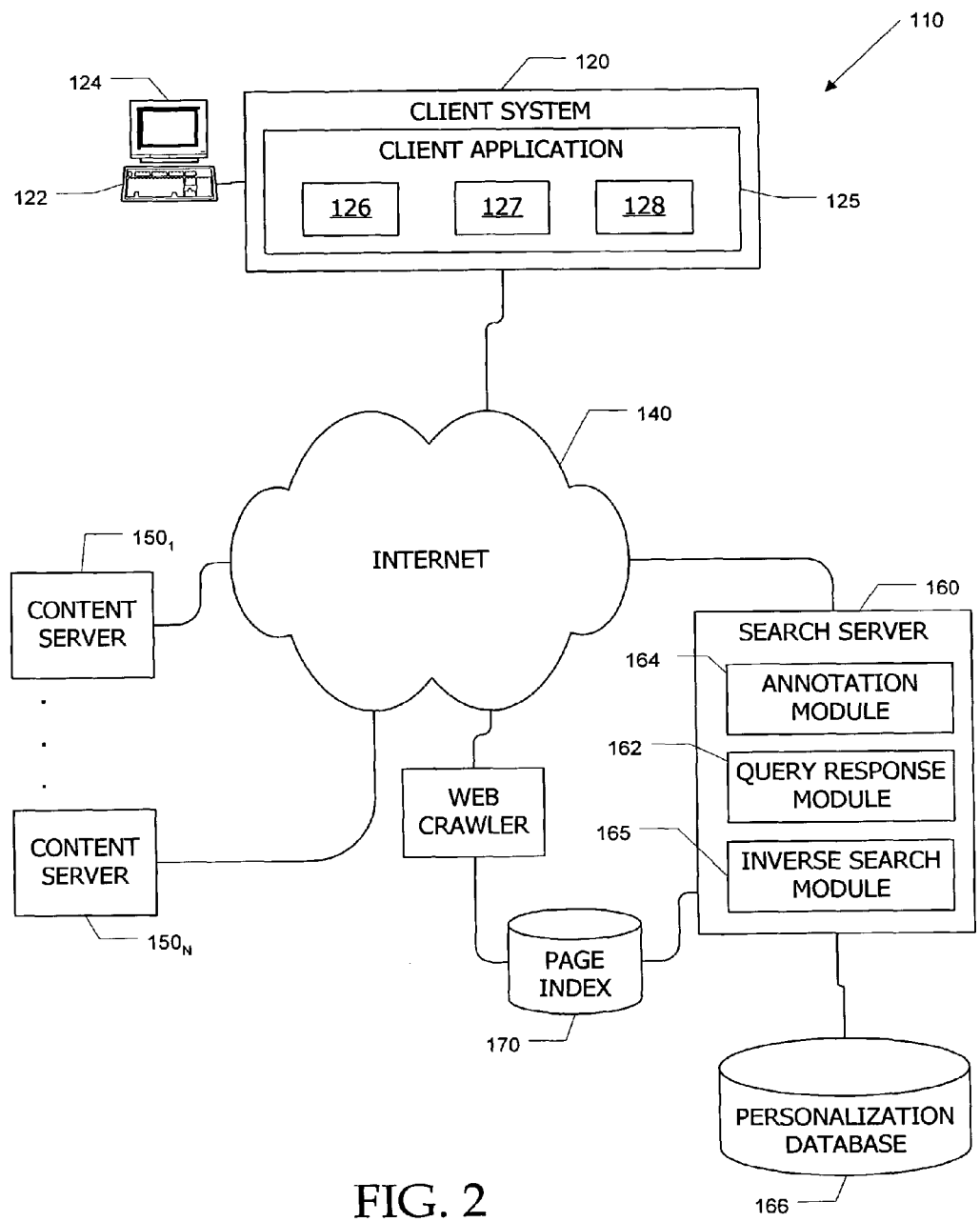
FIG. 2. is a block diagram of an information retrieval and communication network according to another embodiment of the present invention.

FIG. 2 illustrates another information retrieval and communication network 110 for communicating media content according to an embodiment of the invention. As shown, network 110 includes client system 120, one or more content server systems 150, and a search server system 160. In network 110, client system 120 is communicably coupled through Internet 140 or other communication network to server systems 150 and 160. As discussed above, client system 120 and its components are configured to communicate with server systems 150 and 160 and other server systems over the Internet 140 or other communication networks.

According to one embodiment, a client application (represented as module 125) executing on client system 120 includes instructions for controlling client system 120 and its components to communicate with server systems 150 and 160 and to process and display data content received therefrom. Client application 125 is preferably transmitted and downloaded to client system 120 from a software source such as a remote server system (e.g., server systems 150, server system 160 or other remote server system), although client application module 125 can be provided on any software storage medium such as a floppy disk, CD, DVD, etc., as discussed above. For example, in one aspect, client application module 125 may be provided over the Internet 140 to client system 120 in an HTML wrapper including various controls such as, for example, embedded JavaScript or Active X controls, for manipulating data and rendering data in various objects, frames and windows.

Additionally, client application module 125 includes various software modules for processing data and media content, such as a specialized search module 126 for processing search requests and search result data, a user interface module 127 for rendering data and media content in text and data frames and active windows, e.g., browser windows and dialog boxes, and an application interface module 128 for interfacing and communicating with various applications executing on client 120. Examples of applications executing on client system 120 with which application interface module 128 is preferably configured to interface according to aspects of the present invention include various e-mail applications, instant messaging (IM) applications, browser applications, document management applications and others. Further, user interface module 127 may include a browser, such as a default browser configured on client system 120 or a different browser.

According to one embodiment, search server system 160 is configured to provide search result data and media content to client system 120, and content server system 150 is configured to provide data and media content such as web pages to client system 120, for example, in response to links selected in search result pages provided by search server system 160.

In some variations, search server system 160 returns content as well as, or instead of, links and/or other references to content. Search server system includes a query response module 162 configured to receive a query from a user and generate search result data therefor, a user annotation module 164 configured to detect and respond to user interaction with the search result data, and an "inverse search" module 165 configured to provide search-related information about URLs submitted by the user, as described below.

Query response module 162 in one embodiment references various page indexes 170 that are populated with, e.g., pages, links to pages, data representing the content of indexed pages, etc. Page indexes may be generated by various collection technologies including an automatic web crawler 172, and/or various spiders, etc., as well as manual or semi-automatic classification algorithms and interfaces for classifying and ranking web pages within a hierarchical structure. These technologies may be implemented on search server system 160 or in a separate system (e.g., web crawler 172) that generates a page index 170 and makes it available to search server system 160. Various page index implementations and formats are known in the art and may be used for page index 170.

Query response module 162 in one embodiment also references a personalization database 166. Personalization database 166, which may be implemented using conventional database technologies, includes user-specific information, in particular records of user-supplied annotations for various Web pages or sites. An annotation can include any type of user-supplied metadata, including descriptive and/or evaluative information; the metadata might include, for example, freeform text, keywords or tags, numerical ratings reflecting a user judgment (e.g., favorable or unfavorable) as to the merits of the page or site, and so on. As used herein, a "keyword" is a word or short phrase that describes the content of the subject page or site and that is provided by a user who is free to choose any word or short phrase; a "tag" is a word or short phrase that describes the content of the subject page or site and that is selected by a user from a predefined vocabulary such as a hierarchical taxonomy of category labels. Each annotation is advantageously stored in association with the URL (or other identifier) of the subject page or site and in association with an identifier of the user who created it. Examples of suitable systems and methods for collecting and storing user annotations are described in above-referenced application Ser. No. 11/081,860; it is to be understood that the present invention is not limited to particular annotation formats, content, or collection technologies.

Query response module 162 is configured to provide data responsive to various search requests (queries) received from a client system, in particular from search module 126. As used herein, the term "query" encompasses any request from a user (e.g., via client 120) to search server 160 that can be satisfied by searching the Web (or other corpus) indexed by page index 170. In one embodiment, a user is presented with a search interface via search module 126. The interface may include a text box into which a user may enter a query (e.g., by typing), check boxes and/or radio buttons for selecting from predefined queries, a directory or other structure enabling the user to limit search to a predefined subset of the full search corpus (e.g., to certain web sites or a categorical subsection within page index 170), etc. Any search interface may be used.

Query response module 162 is advantageously configured with search related algorithms for processing and ranking web pages relative to a given query (e.g., based on a combination of logical relevance, as measured by patterns of occurrence of the search terms in the query; context identifiers associated with query terms and/or particular pages or sites; page sponsorship; connectivity data collected from multiple pages; etc.). For example, query response module 162 may parse a received query to extract one or more search terms, then access page index 170 using the search terms, thereby generating a list of "hits," i.e., pages or sites (or references to pages or sites) that are determined to have at least some relevance to the query. Query response module 162 may then rank the hits using one or more ranking algorithms. Particular algorithms for identifying and ranking hits are not critical to the present invention, and conventional algorithms may be used.

In some embodiments, query response module 162 is also configured to access personalization database 166 to retrieve annotation information associated with the user who entered the current query and to incorporate such information into the query results. For example, in one embodiment where at least some of the annotations include ratings (or other data reflecting the user's evaluation of a page or site), query response module 162 might generate a separate list of "favored" results based on favorable user ratings of particular pages or sites in previously entered annotations; or query response module 162 might incorporate the user's ratings of particular pages or sites in the ranking of search results; or query response module 162 might use unfavorable user ratings of particular pages or sites to determine whether to drop a hit from the list of results. Where the annotations include descriptive text, keywords, or tags, the appearance of a search term in any of these elements may be considered during identification and/or ranking of the search hits. Examples of techniques for incorporating a user's annotations into a query response operation are described in above-referenced application Ser. No. 11/081,860.

In addition, query response module 162 may also access and use annotations in personalization database 166 for which the creating user is a member of a trust network defined for the querying user. Annotations from members of a querying user's trust network can advantageously be used in ways generally similar to the user's own annotations. Individual annotations can be used, or metadata can be aggregated across the annotations of the same subject page or site created by different trust network members (e.g., by computing an average rating for the subject page or site, or an aggregate keyword set for the subject page or site). Examples of defining trust networks and using trust network members' annotations during search are described in above-referenced application Ser. No. 11/082,202.

To enable personalization features such as user and trust network annotations, search server 160 advantageously provides a user login feature, where "login" refers generally to any procedure for identifying and/or authenticating a user of a computer system. Numerous examples are known in the art and may be used in connection with embodiments of the present invention. For instance, in one embodiment, each user has a unique user identifier (ID) and a password, and search server 160 prompts a user to log in by delivering to client 120 a login page via which the user can enter this information. In other embodiments, biometric, voice, or other identification and authentication techniques may be used in addition to or instead of a user ID and password. Once the user has identified himself or herself, e.g., by logging in, the user can enter and/or update annotations by interacting with user annotation module 164. For instance, the user may be able to enter or edit annotations for any Web page displayed by client application 125. The user may also be able to enter or edit annotations from search result pages generated by query response module

162. Further, each query entered by a logged-in user can be associated with the unique user ID for that user; based on the user ID, query response module 162 can access personalization database 166 to incorporate the user's stored judgment information into responses to that user's queries. User login is advantageously persistent, in the sense that once the user has logged in (e.g., via client application 125), the user's identity can be communicated to search server 160 at any appropriate time while the user continues to operate client application 125. Thus, personalization features described herein can be made continuously accessible to a user.

Inverse search module 165 is configured to provide data responsive to various "inverse search" requests received from a client system, e.g., from search module 126. Unlike a conventional search (referred to herein as a "forward" search), the user begins an inverse search by providing a known URL as the "query." For example, the user may enter the URL into an "inverse query" box, click on an "inverse search" button associated with a particular URL on a search results page, or activate a toolbar button that submits the URL of a page the user is currently viewing as an inverse search query.

In response to the inverse query, inverse search module 165 accesses page index 170 and/or personalization database 166 to collect information (metadata) about the URL. That information is organized and presented to the user via client 120. Various search-related information may be reported in the inverse search result, including any or all of the following:

A popularity score for the URL. The score may be based, e.g., on how many times users who entered forward search queries and received that URL in response clicked through to that page or site.

A list of queries for which the URL would be returned as a search hit. The list may be limited, e.g., to queries for which the URL would receive a relatively high ranking, and may be organized according to the fraction of users entering a given query who clicked through to that page or site or according to other indicators that previous users regarded the URL as being, particularly relevant to the query Information about annotations associated with the URL. This may include information from annotations created by the querying user, by members of the querying user's trust network, and/or by other users. For example, one or more of the user's own rating, an aggregate rating by members of the user's trust network, and a global score (aggregated over all users who have rated the site) might be presented.

Any other information about the page or site. Examples include contact information (e.g., name, e-mail address, physical address or location, phone number) for the owner (typically the entity responsible for maintaining the content) of the site; information as to whether the page or site includes adult content; information as to whether the page or site launches pop-up windows; and so on.

It is to be understood that the inverse search information is not limited to the foregoing. Any information about the URL or the identified page site, and in particular any information reflecting relevance of the identified page or site to a particular forward query or any information reflecting user opinion of the identified page or site, may be provided via inverse search module 165.

It will be appreciated that the search system described herein is illustrative and that variations and modifications are possible. The content server and search server system may be part of a single organization, e.g., a distributed server system such as that provided to users by Yahoo! Inc., or they may be part of disparate organizations. Each server system generally includes at least one server and an associated database system, and may include multiple servers and associated database systems, and although shown as a single block, may be geographically distributed. For example, all servers of a search server system may be located in close proximity to one another (e.g., in a server farm located in a single building or campus), or they may be distributed at locations remote from one another (e.g., one or more servers located in city A and one or more servers located in city B). Thus, as used herein, a "server system" typically includes one or more logically and/or physically connected servers distributed locally or across one or more geographic locations; the terms "server" and "server system" are used interchangeably. In addition, the query response module, user judgment module, and inverse search module described herein may be implemented on the same server or on different servers.

The search server system may be configured with one or more page indexes and algorithms for accessing the page index(es) and providing search results to users in response to search queries received from client systems. The search server system might generate the page indexes itself, receive page indexes from another source (e.g., a separate server system), or receive page indexes from another source and perform further processing thereof (e.g., addition or updating of various page information). In addition, while the search server system is described as including a particular combination of component modules, it is to be understood that a division into modules is purely for convenience of description; more, fewer, or different modules might be defined.

In addition, in some embodiments, some modules and/or metadata described herein as being maintained by search server 160 might be wholly or partially resident on client system 120. For example, some or all of a user's annotations could be stored locally on client system 120 and managed by a component module of client application 125. Other data, including portions or all of page index 170, could be periodically downloaded from search server 160 and stored by client system 120 for subsequent use. Further, client application 125 may create and manage an index of content stored locally on client 120 and may incorporate local content into Web search results, provide a separate facility for searching local content, and so on.

II. Inverse Search

In an embodiment of the present invention, inverse search module 165 receives a URL (or other identifier of a source of content) from client 120 and performs an inverse search using the URL as a query. Inverse search module 165 collects information about the URL and returns it to client 120, e.g., in the form of an inverse search results page.

Inverse searches may be initiated by a user in various ways. For example, FIG. 3 shows a search results page 300 that might be presented to a user in response to a (forward) search query. Search results page 300 includes an ordered listing 302 of search hits, each of which has a URL 304. For each URL 304, an "Inverse Search" button 306 is provided. When the user activates (e.g., clicks on) a button 306, a message including the target URL 304 associated with the activated Inverse Search button 306 is sent to inverse search module 165, which executes the inverse search and returns results to client 120. Depending on implementation, inverse search module 165 may access personalization database 166, e.g., to retrieve annotations associated with the target URL; a log of queries and associated URLs that may be maintained, e.g., in personalization database 166 or another data store accessible to search server 160; page index 170; and/or other sources of metadata associated with the target URL.

Figure 4:
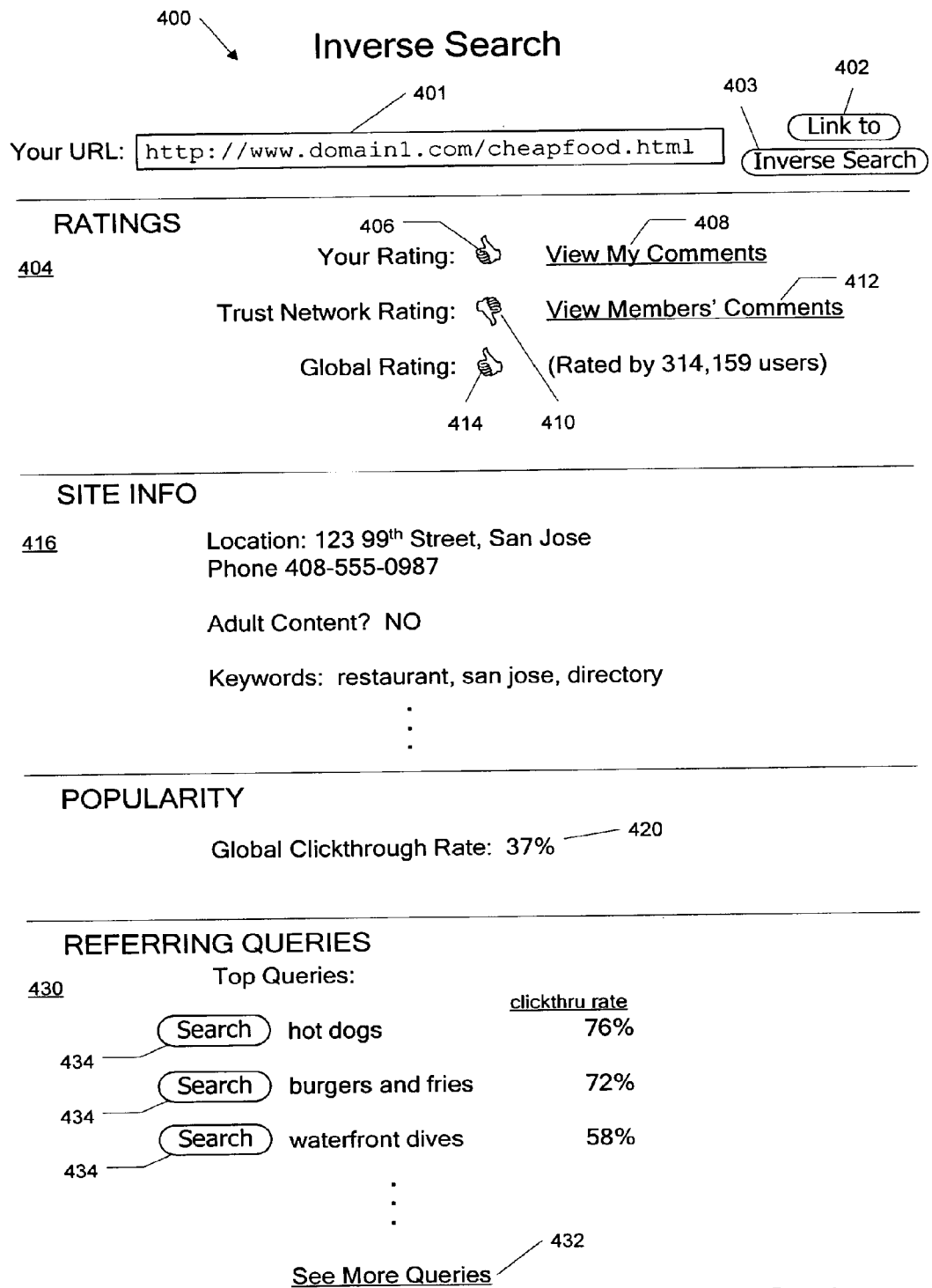
FIG. 4 is an example of an inverse search results page generated in response to an inverse search query according to an embodiment of the present invention.

An example of inverse search information that might be returned is illustrated in FIG. 4 as an inverse search result page 400. At the top of page 400, the searched URL is shown in a text box 401. A "Link to" button 402 enables the user to access the referenced page or site, and an "Inverse Search" button 403 allows the user to modify the URL in text box 401 and execute a new inverse search.

Section 404 incorporates ratings data related to the target page identified by the searched URL, which inverse search module 165 may obtain, e.g., by accessing annotations in personalization database 166 that are associated with the searched URL. The querying user's rating (if he or she has rated the referenced page or site) is shown by an icon 406. The rating is accompanied by a control 408 allowing the user to view and/or edit his or her annotation for the subject page. If the user has not annotated the subject page or site, the rating information might be replaced by an option inviting the user to rate the site. An aggregate rating from the user's trust network is shown separately by an icon 410. This rating may be accompanied by a control 412 allowing the user to view annotations by individual trust network members. Suitable interfaces for viewing (and editing) annotations are described in above-referenced application Ser. No. 11/081,860 and Ser. No. 11/082,202. A global rating may also be shown by an icon 414, next to which may be printed information such as the number of users who have rated the referenced page or site.

Section 416 provides other information (metadata) about the target page or site. For example, a location and phone number associated with an owner (typically the entity responsible for maintaining the content) of the target page or site might be displayed; if such information is not available, a "Not Available" indication might be substituted, or the fields might be omitted. An "adult content" indicator is also provided. Presence or absence of adult content can be determined based on user annotations, editorial review by agents of the creator of page index 170 or the provider of search server 160, voluntary indication of such content in the source code of the page, and so on. Any other metadata related to the page or site might also be displayed, including any keywords or category identifiers that have been determined for the site. Keywords or category identifiers can be based, e.g., on automated processes for analyzing and categorizing page content, editorial review procedures, or aggregation of keywords or tags included in user annotations.

Next, a popularity score (in this case, a clickthrough rate) 420 is displayed. This score can be defined in various ways to reflect the fraction of users who regarded the target page or site as helpful or interesting. In the embodiment shown in FIG. 4, the popularity score is a clickthrough rate for the target page or site. The clickthrough rate may be defined as the fraction $N_{click}/N_{hit}$, where $N_{hit}$ is the number of users who received the target page's URL in response to a query and $N_{click}$ is the number of those users who clicked through from the search results page to the target page or site. In one embodiment, the clickthrough rate be determined by tracking, in page index 170 or elsewhere, the number of times that a given URL is returned as a (forward) search hit and the number of clickthroughs to that page or site from any search results page; inverse search module 165 can then compute the ratio. Alternatively, clickthrough rates for a large number of URLs might be computed periodically (e.g., daily) and cached for use in responding to inverse and/or forward queries. Conventional techniques for detecting a clickthrough may be used, including counting clickthroughs only when the user remains at the target page or site for at least a minimum time. Other popularity scores may also be used.

The annotation data (e.g., ratings), clickthrough rates and similar information may help the user to assess the value (e.g., reliability, usefulness, etc.) of a site he or she does not know. For example, if the user is looking for information about a topic with which he or she is unfamiliar, trust network ratings, global ratings, clickthrough rates and so on may be useful indicators as to the relative value of different sites listed on a search results page for that topic.

In addition to general popularity data, information can be provided about specific forward-search queries for which the target page or site would be identified as a hit. For instance, section 430 includes a list of forward-search queries ("referring queries") for which the target page or site was returned as a hit during a forward search. To generate this information, a record may be kept that associates each URL with each query for which it was returned as a hit over some suitable time period (e.g., a day, a week, or a month). The number of times each such query was entered may also be counted. In some embodiments, only queries for which the site is among the highest ranked hits (e.g., the top 20, top 50, top 5%, top 10% and so on) might be included as referral queries. In other embodiments, only queries for which the clickthrough rate to the site exceeds some threshold might be included. In still other embodiments, all queries are considered regardless of where the site ranked or what fraction of users who entered that query clicked through to the site.

In some embodiments, the referral queries in section 430 may be listed in descending order of query frequency, in descending order of clickthrough rates (in embodiments where clickthrough rate information is collected per query), or in some other convenient order. The page may also include controls (not explicitly shown) that allow the user to select among a number of sorting options. In the event of a large number of referral queries, only the "top" queries might be presented; button 432 may be provided to enable the user to view additional referral queries.

In section 430, each referral query is presented with an accompanying "Search" button 434, which can be used to transmit that query as a new (forward) search query to query response module 162. In this embodiment, inverse search might be helpful to a user trying to formulate a more focused query. For example, suppose that the user enters a first query for a forward search and receives a large number of search results. The user identifies a relevant hit somewhere in the list, but most of the sites seem to be irrelevant. The user can execute an inverse search on the URL of the relevant hit and view the referral queries for that URL. If one of these queries seems to be on target, the user can click the corresponding button 434 to search that query. In addition, a forward search box (not shown in FIG. 4) may be provided on page 400, allowing the user to enter a new query; this query might include terms from any of the referral queries and/or any other terms that come to the user's mind while viewing the referral queries. The new forward search results might lead to still further refinement of the query. Thus, the user can refine a search by performing an inverse search on one or more of the most promising hits and using the referring queries to formulate a refined query for a new forward search.

It is to be understood that the inverse search result page described herein is illustrative and that variations are possible. Some or all of the inverse search data may be displayed for each URL in a forward search results page, while other data is presented only when the user executes an inverse search. For instance, annotation information, global ratings, and/or clickthrough rates might be shown on the forward search results page, while referral queries are made available on a separate inverse search page. Information other than that shown, such as a title and abstract (or excerpts) of the referenced page or site and any other information about the URL (or the referenced page or site) that is available to inverse search module 165 may be included in an inverse search results page.

Figure 5:
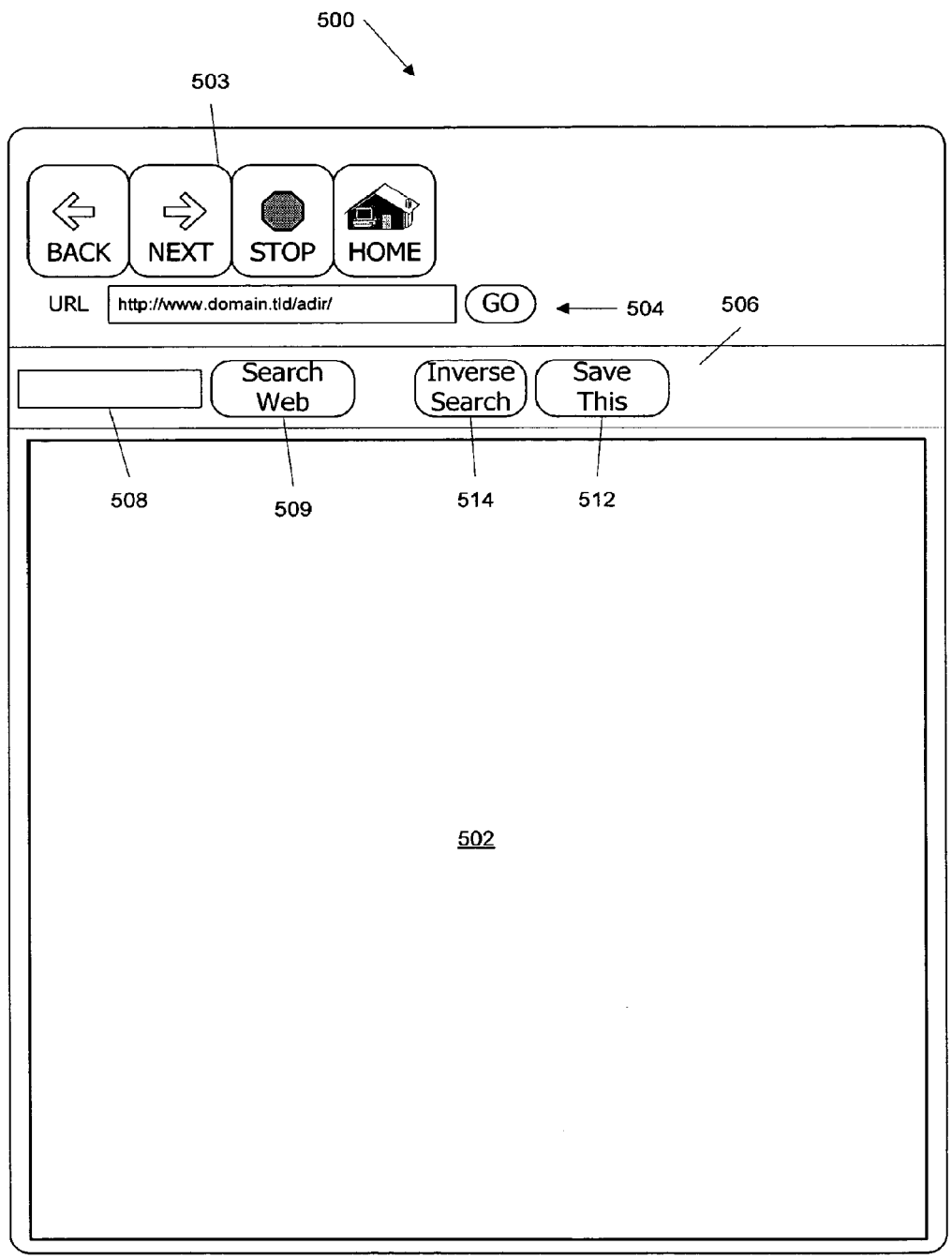
FIG. 5 is an example of a search toolbar for a Web browser according to an embodiment of the present invention.

In another embodiment, a user can initiate an inverse search while viewing any page by using a browser client 125 (FIG. 2) that is equipped with a suitable toolbar. FIG. 5 is an example of a toolbar-based interface for initiating an inverse search using the URL of any page the user happens to be viewing. A Web browser window 500 includes conventional elements such as a viewing area 502 for displaying Web content, a default toolbar 503 that provides conventional navigation buttons (back, forward, and the like), and a text box 504 that shows the URL of the currently displayed page and also allows the user to enter a URL for a page to be displayed in viewing area 502. Browser window 500 also includes a search toolbar 506 that may be provided as an add-in to a conventional browser program or as a standard feature of a browser program.

Search toolbar 506 advantageously includes a text box 508 and "Search Web" button 509 via which the user can submit forward-search queries to search server 160 (FIG. 2). A "Save This" button 712 opens a page or dialog box allowing the user to annotate the currently displayed page, e.g., as described in above-referenced application Ser. No. 11/081,860. An "Inverse Search" button 714 submits an inverse search request to search server 160; the inverse-search query is the URL of the currently displayed page. Search toolbar 506 may also include other components in addition to or instead of those shown. In addition, any other persistent interface (i.e., an interface accessible while the user is viewing any Web page) may be substituted; a search toolbar is not required.

In some embodiments, search toolbar 506 can be configured such that it is usable in a "generic" state by users who are not logged in to search server 160 and in a "personalized" state by users who are logged in. In the generic state, the toolbar provides access to basic search services (e.g., via text box 508 and "Search" button 509) and a button allowing the user to log in for access to personalized services. In the personalized state, personalization features can be supported through the toolbar. For instance, in embodiments where the inverse search result includes user-specific annotation data (e.g., ratings), "Inverse Search" button 514 might be operable only in the personalized state of toolbar 506; alternatively, button 514 might also be provided in the generic state, with the content of the inverse search report including only generic information (e.g., a global rating but not a user rating or trust network rating). In still other embodiments, the browser might be redirected to a log-in page if button 514 is activated while the toolbar is in the generic state.

Other interfaces for initiating an inverse search may also be provided. For example, a conventional forward-search interface page might be modified to include an additional text box via which the user can submit a URL and initiate an inverse search.

III. Further Embodiments

While the invention has been described with respect to specific embodiments, one skilled in the art will recognize that numerous modifications are possible. For instance, the appearance of forward search result pages, inverse search result pages, and other interface elements may differ from the examples shown herein. Interface elements are not limited to buttons or clickable regions of a page; any interface implementation may be used. Steps in the various processes described herein may be combined, modified or varied; order of steps may be varied; and steps described as sequential may be executed in parallel or vice versa. All queries and site listings used herein are illustrative, and ratings are applied for purposes of illustration only and are not meant to imply any opinion, endorsement, or disparagement of any actual Web page or site.

It should be understood that in its rating-related the invention is also not limited to any particular rating scheme, and some embodiments might offer users the option of choosing among alternative rating schemes (e.g., thumbs up/thumbs down or rating on a scale). In some embodiments, only favorable or neutral ratings might be supported. In other embodiments, ratings might not be collected at all. Where ratings are not collected, user annotations might still be collected and may provide other types of metadata that can be reported in an inverse search report.

Further, in some embodiments, rather than a single overall rating, the user might be able to rate specific dimensions of a page or site, including dimensions related to technical performance, content, and esthetics. For example, technical performance ratings might include ratings reflecting the speed of accessing the page, reliability of the server, whether outgoing links from the page work, and so on. Content ratings might include ratings reflecting whether the content is current, accurate, comprehensible, well organized, and so on. Esthetic ratings might include ratings reflecting the user's opinion of the layout, readability, use of graphical elements, and so on. The user can be asked to rate a site in any number of these or other dimensions. In some embodiments, the user might also be able to give an overall rating, or an overall rating could be computed from the ratings given to each aspect.

In other embodiments, a search provider may also include sponsored links, in which content providers pay to have links to their sites provided in search results, e.g., in a special designated area of the results page. One embodiment of the present invention provides inverse search buttons for any sponsored links as well as other search hits. Executing the inverse search for a sponsored link would provide information similar to that provided for any other URL.

In some embodiments, a user may be able to define multiple trust networks, e.g., for searches in different categories. In one such embodiment, the user might define one trust network for general searches, another trust network for searches within a "Shopping" property, yet another trust network for searches within a "News" property, and so on. If multiple trust networks are defined, ratings or other metadata from each trust network may be presented separately in the inverse search result. Alternatively, where a category for the target URL of the inverse search can be determined, the rating might be reported for the trust network that best matches that category.

Additionally, inverse searches are not limited to being initiated from a forward search results page. An inverse search box may be provided to a user from any page, allowing a user to enter any URL he or she might know, or incorporated into a toolbar (e.g., as described above).

The embodiments described herein may make reference to web sites, links, and other terminology specific to instances where the World Wide Web (or a subset thereof) serves as the search corpus. It should be understood that the systems and processes described herein can be adapted for use with a different search corpus (such as an electronic database or document repository) and that results may include content as well as links or references to locations where content may be found.

Computer programs incorporating various features of the present invention may be encoded on various computer readable media for storage and/or transmission; suitable media include magnetic disk or tape, optical storage media such as CD or DVD, flash memory, and carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

While the present invention has been described with reference to specific hardware and software components, those skilled in the art will appreciate that different combinations of hardware and/or software components may also be used, and that particular operations described as being implemented in hardware might also be implemented in software or vice versa.

Thus, although the invention has been described with respect to specific embodiments, it will be appreciated that the invention is intended to cover all modifications and equivalents within the scope of the following claims.

What is claimed is:

1. A method comprising:
  receiving, at a server, from a client, a forward query;
  in response to the forward query, the server performing the steps of:
    identifying a plurality of documents that satisfy said forward query;
    generating a forward search report for the forward query, the forward search report identifying the plurality of documents as a forward search result for the forward query;
    wherein the forward search report includes a first instruction configured to cause the client to submit a inverse query to the server, the inverse query comprising a particular identifier for a particular document of the plurality of documents; and
    transmitting a web page to the client, the web page comprising at least the forward search report identifying the forward search result for the forward query;
  for at least the particular document in the plurality of documents, identifying data that was submitted by one or more users, other than a querying user, in association with whom the forward query was received, in response to the one or more users receiving one or more previous search results in which the particular document was identified;
  receiving, at the server, from the client, the inverse query with the particular identifier;
  in response to the inverse query, the server performing the steps of:
    identifying the particular document based on the particular identifier;
    generating a inverse search report for the inverse query, the inverse search report comprising information included in or derived from the data that was submitted by the one or more users, other than the querying user, in response to the one or more users receiving the one or more previous search results in which the particular document was identified; and
    transmitting the inverse search report to the client;
  wherein the method is performed by one or more computing devices.

2. The method of claim 1, wherein the first instruction is configured to cause the client to submit the inverse query upon user selection of a button associated with the particular document in the forward search report.

3. The method of claim 1, wherein the particular identifier is a URL for the particular document.

4. The method of claim 1, wherein the information in the inverse search report includes a popularity score for the particular document, the popularity score derived from the data that was submitted by the one or more users in response to the one or more users receiving the one or more previous search results in which the particular document was identified.

5. The method of claim 4 wherein the popularity score is based on a clickthrough rate for the particular document measured from previous searches executed by the server.

6. The method of claim 1 wherein the information in the inverse search report includes a rating of the particular document, the rating having been supplied by the one or more users in response to the one or more users receiving the one or more previous search results in which the particular document was identified.

7. The method of claim 6 wherein the rating is an average rating of the particular document, determined from a plurality of ratings supplied by the one or more users in response to the one or more previous search results.

8. The method of claim 6 wherein the forward query is associated with the querying user, wherein the one or more users are selected from a network defined for the querying user.

9. The method of claim 1 wherein the information in the inverse search report includes a plurality of annotations associated with the particular document, wherein the plurality of annotations were submitted by the one or more users in response to the one or more users receiving the one or more previous search results in which the particular document was identified.

10. A method comprising:
  receiving, at a server, from a client, a forward query;
  in response to the forward query, the server performing the steps of:
    identifying a plurality of documents that satisfy said forward query;
    generating a forward search report for the forward query, the forward search report identifying the plurality of documents as a forward search result for the forward query;
    wherein the forward search report includes a first instruction configured to cause the client to submit a inverse query to the server, the inverse query comprising a particular identifier for a particular document of the plurality of documents; and
    transmitting a web page to the client, the web page comprising at least the forward search report identifying the forward search result for the forward query;
  for at least the particular document in the plurality of documents, identifying one or more additional queries, other than the forward query, in response to which the server has previously returned other search results that identified the particular document;
    wherein each of the one or more additional queries includes one or more terms that are not in the forward query;
  receiving, at the server, from the client, the inverse query with the particular identifier;
  in response to the inverse query, the server performing the steps of:
    identifying the particular document based on the particular identifier;
    generating a inverse search report for the inverse query, the inverse search report comprising the one or more additional queries in response to which the server has previously returned the other search results that identified the particular document; and transmitting the inverse search report to the client;

wherein the method is performed by one or more computing devices.

11. The method of claim 10 wherein the one or more additional queries are shown in the inverse search report in an order based at least in part on a clickthrough rate for the particular document relative to each of the one or more additional queries.

12. A method comprising:

receiving, at a server, from a client, a forward query;

in response to the forward query, the server performing the steps of:

identifying a plurality of documents that satisfy said forward query;

generating a forward search report for the forward query, the forward search report identifying the plurality of documents as a forward search result for the forward query;

wherein the forward search report includes a first instruction configured to cause the client to submit a inverse query to the server, the inverse query comprising a particular identifier for a particular document of the plurality of documents; and transmitting a web page to the client, the web page comprising at least the forward search report identifying the forward search result for the forward query;

for at least the particular document in the plurality of documents, identifying a physical location of an owner or a physical location of a provider of the particular document;

receiving, at the server, from the client, the inverse query with the particular identifier;

in response to the inverse query, the server performing the steps of:

identifying the particular document based on the particular identifier;

generating a inverse search report for the inverse query, the inverse search report comprising the physical location of the owner or the physical location of the provider; and transmitting the inverse search report to the client;

wherein the method is performed by one or more computing devices.

13. The method of claim 12 wherein the data identifying the physical location of the owner or provider of the particular document was extracted from the particular document and stored in a data store prior to the server receiving the inverse query, and wherein identifying the physical location includes retrieving the data from the data store.

14. One or more non-transitory computer-readable media storing instructions that, when executed by one or more computing devices, cause performance of:

displaying a first control in association with a browser window;

upon selection of the first control, submitting an inverse query to a server, the inverse query including a URL of a page that is currently shown in the browser window, the inverse query further configured to request an inverse search report for the URL, the inverse search report comprising metadata that was collected during previous interactions, involving the URL, between the server and one or more users;

receiving, from the server, in response to inverse query, the inverse search report;

causing the browser window to display the inverse search report.

15. The one or more non-transitory computer-readable media of claim 14, wherein the instructions further cause performance of:

displaying the first control as a button in a toolbar in the browser window.

16. The one or more non-transitory computer-readable media of claim 14, wherein the instructions further cause performance of:

displaying the first control in a persistent interface that is accessible while the user is viewing any of a plurality of web pages in the browser window.

17. The one or more non-transitory computer-readable media of claim 14, wherein the instructions further cause performance of:

displaying a second control in association with the browser window;

upon selection of the second control, causing display of an interface configured to accept one or more annotations associated with the URL and send the one or more annotations to the server;

wherein the metadata in the inverse search report that the inverse query is configured to request includes annotations from the one or more users via the interface at one or more other browsers.

18. The one or more non-transitory computer-readable media of claim 14, wherein the instructions further cause performance of:

displaying a search interface configured to submit a forward search to the server;

displaying the first control adjacent to the search interface.

19. The one or more non-transitory computer-readable media of claim 14, wherein the metadata in the inverse search report that the inverse query is configured to request includes one or more:

a popularity score for the URL based on the interactions;

a rating for the URL based on the interactions; or one or more referral queries in response to which the server has previously returned search results that identified the URL.

20. The one or more non-transitory computer-readable media of claim 14, wherein the instructions further cause performance of:

detecting whether a user of the browser window is currently logged in to the server;

submitting a personalized inverse query when the user is currently logged in to the server, the personalized inverse query requesting a search report that is based upon a first set of the one or more users, the first set being selected from a network defined for the user.

* * * * *